(12) United States Patent  
Alfano (10) Patent No.: US 9,914,525 B2  
(45) Date of Patent: Mar. 13, 2018

(54) ROTORCRAFT TOP FAIRING FITTED WITH A MOVABLE MEMBER FOR GUIDING A STREAM OF AIR FLOWING TOWARDS THE REAR OF THE ROTORCRAFT

(71) Applicant: AIRBUS HELICOPTERS, Marignane (FR)

(72) Inventor: David Alfano, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 211 days.

(21) Appl. No.: 14/925,472

(22) Filed: Oct. 28, 2015

(65) Prior Publication Data

US 2016/0121997 A1    May 5, 2016

(30) Foreign Application Priority Data

Oct. 31, 2014 (FR) ...................................... 14 02463

(51) Int. Cl.
| | |
|---|---|
| B64C 11/00 | (2006.01) |
| B64C 27/54 | (2006.01) |
| B64C 7/00 | (2006.01) |
| B64C 27/06 | (2006.01) |
| B64C 13/16 | (2006.01) |
| B64C 27/02 | (2006.01) |
| B64C 27/04 | (2006.01) |

(52) U.S. Cl.
CPC ................ *B64C 7/00* (2013.01); *B64C 13/16* (2013.01); *B64C 27/02* (2013.01); *B64C 27/04* (2013.01); *B64C 27/06* (2013.01)

(58) Field of Classification Search
CPC .. B64C 7/00; B64C 9/00; B64C 11/02; B64C 13/00; B64C 13/16; B64C 21/00; B64C 23/00

See application file for complete search history.

(56) References Cited

U.S. PATENT DOCUMENTS 3,101,920 A * 8/1963 Fradenburgh ............. B64C 7/00  
244/130  
3,130,942 A    4/1964 Fradenburg  
(Continued)

FOREIGN PATENT DOCUMENTS

GB          916852 A * 1/1963 ............... B64C 7/00

OTHER PUBLICATIONS

French Search Report for French Application No. FR 1402463, Completed by the French Patent Office dated Jun. 2, 2015, 6 Pages.

*Primary Examiner* — Philip J Bonzell  
(74) *Attorney, Agent, or Firm* — Brooks Kushman P.C.

(57) ABSTRACT

A rotorcraft provided on top with a waterdrop-shaped fairing arranged below the rotary wing of a main rotor of the rotorcraft and overlying a cover covering a power plant of the rotorcraft. The trailing edge(s) of the fairing is/are provided with a respective movable member guiding a first stream of air flowing along the fairing and escaping from the trailing edge towards the rear of the rotorcraft in flight. By way of example, the movable member is arranged as a flap or as a bladed roller that may potentially be motor-driven as a function of the effects of the first stream of air on the behavior of the rotorcraft in flight.

22 Claims, 3 Drawing Sheets

(56) References Cited

U.S. PATENT DOCUMENTS

| | | | | |
|---|---|---|---|---|
| 3,517,898 A | * | 6/1970 | Laville | B64C 27/02 |
| | | | | 244/17.11 |
| 7,229,251 B2 | * | 6/2007 | Bertolotti | B64C 1/00 |
| | | | | 416/128 |
| 2006/0269411 A1 | * | 11/2006 | Bertolotti | B64C 1/00 |
| | | | | 416/134 A |
| 2011/0036954 A1 | | 2/2011 | Piasecki | |

* cited by examiner fig.4 fig.5

ROTORCRAFT TOP FAIRING FITTED WITH A MOVABLE MEMBER FOR GUIDING A STREAM OF AIR FLOWING TOWARDS THE REAR OF THE ROTORCRAFT

CROSS REFERENCE TO RELATED APPLICATION

This application claims priority to French patent application No. FR 14 02463 filed on Oct. 31, 2014, the disclosure of which is incorporated in its entirety by reference herein.

BACKGROUND OF THE INVENTION (1) Field of the Invention

The present invention relates to means for influencing the flow of air over the outside surfaces of rotorcraft. The present invention relates more particularly to a fairing conventionally arranged at the top of a rotorcraft being located under the rotary wing of a main rotor of substantially vertical axis and above a cover covering a power plant of the rotorcraft.

(2) Description of Related Art

A rotorcraft is a rotary wing aircraft having one or more rotors, including at least a main rotor of substantially vertical axis arranged at the top of the rotorcraft. The main rotor typically provides the rotorcraft at least with lift, and in the specific circumstance of a helicopter, possibly also with propulsion and/or guidance along its movement axes.

A rotorcraft may also have at least one auxiliary rotor of substantially horizontal axis. Conventionally, such an auxiliary rotor may be installed at the end of a tail boom in order to control the yaw attitude of the rotorcraft. Such an auxiliary rotor can also be used to provide a rotorcraft with a propulsive propeller for moving the rotorcraft in translation, as for a helicopter having high-speed propulsion in translation.

The rotor(s) of a rotorcraft is/are conventionally driven in rotation by a power plant including at least one fuel-burning engine, in particular a turboshaft engine. The power plant is typically located in the top portion of the rotorcraft beneath the wing of the main rotor. A cover is arranged around the power plant in order to direct the flow of air towards the rear of the rotorcraft and enhance the aerodynamic characteristics of the rotorcraft.

Such a cover is commonly raised by a fairing that covers a mechanism for operating blades of the rotary wing of the main rotor in compliance with flight commands generated by a pilot of the rotorcraft. Such a fairing is commonly referred to as a "hub fairing" or "pylon".

For example, such a mechanism for controlling the blades of the rotary wing of the main rotor is commonly formed by a pair of "swashplates" movably mounted on a mast carrying the rotary wing. The swashplates are operated by a pilot of the rotorcraft using various control lines in order to cause the pitch of the blades of the rotary wing of the main rotor to vary collectively and/or cyclically so as to modify the attitude of the rotorcraft.

The cover and the fairing on top of it extend mainly in a longitudinally-extending direction of the rotorcraft, conventionally considered as going between the front and the rear of the rotorcraft when on the ground.

Naturally, concepts such as "top", "high portion", "below", "bottom", or "raising", for example are commonly understood relative to the vertical orientation of the rotorcraft when on the ground. Likewise, concepts such as "vertical plane" and "horizontal plane" of the rotorcraft are commonly understood respectively relative to the vertical and horizontal general orientations in which the rotorcraft extends when on the ground.

In this context, it is appropriate to arrange the fairing so as to reduce its aerodynamic drag as much as possible and so as to limit the wake that it generates. The arrangement of the fairing must in particular encourage the stream of air to remain attached along its surface as well as along the surface of the cover provided around the power plant underlying the fairing.

In addition, it is also appropriate to arrange the fairing in order to minimize its wake, in order to stabilize its wake as a function of the flight situation, and in order to avoid giving rise to structural excitation of the outside walls of the rotorcraft, in particular the walls extending towards the rear of the rotorcraft such as the walls of the tail boom and the walls forming stabilizing aerodynamic surfaces.

As described in documents U.S. Pat. No. 3,130,942 and US 2011/0036954, a common solution consists in shaping the profile of the fairing in question to have the shape of a drop of water in a horizontal plane of the rotorcraft. It has nevertheless been found that such a solution is not fully satisfactory for optimizing stabilization of the rotorcraft in the event of a side wind and/or of the rotorcraft sideslipping in yaw, in particular for light rotorcraft where it is desired to enhance their maneuverability in flight.

More particularly, among the constraints on how the fairing should be arranged, the flying quality of the rotorcraft must be preserved. In particular, it is necessary to avoid the flow of air along the fairing giving rise to instabilities in maintaining a flight path and/or to disturbances in yaw attitude control of the rotorcraft.

It is found that when the flow of air around the rotorcraft includes a significant sideways vector component, the regularity of the flow of said turbulence towards the rear of the fairing is disturbed, and consequently the stability of the attitude of the rotorcraft in yaw is affected thereby. More particularly, the turbulence generated at the rear end of the fairing tends to become chaotic with frequency spreading and also tends to move rearwards, potentially impacting against the rear aerodynamic portions.

Such instability in the flow of the turbulence, which is made worse in the event of a side wind and/or of the rotorcraft sideslipping in yaw, has the effect of producing unwelcome vibration that may harm the mechanical strength of the rotorcraft and that can degrade passenger comfort. Furthermore, such a situation tends to destabilize the yaw behavior of the rotorcraft.

In order to mitigate those drawbacks, it is known to truncate the waterdrop-shaped profile of the fairing transversely at its rear end. The effect of this is to improve the regularity of the flow of the turbulence in the event of a side wind and/or of sideslipping in yaw. Nevertheless, arranging the trailing edge of the fairing in that way tends to increase its aerodynamic drag, which is undesirable.

In summary, it is found that various specific arrangements for shaping the fairing in order to improve the flow of air for certain flight situations are unsuitable for other flight situations. As a result, it is necessary to find compromises between various arrangements for the fairing in order to obtain the best possible flow of air that is satisfactory regardless of the flight situation of the rotorcraft.

It is also known for the rear wall of the fairing that is formed by truncating its waterdrop-shaped profile to be arranged as a plane that slopes relative to the horizontal plane of the rotorcraft. Such provisions seek to enhance the guidance of the flow of air along the fairing towards the bottom of the rotorcraft, it being understood that the rotation of the main rotor itself generates a powerful flow of air directed towards the bottom of the rotorcraft together with complex aerodynamic phenomena that disturb the stability of the behavior of the rotorcraft in flight.

Consequently, it is desirable for the overall arrangement and for specific features of the fairing concerning the flow of air along its surfaces to take account also of the wash generated by the main rotor.

However minor they might be, the various features applied to the fairing for the purpose of influencing the flow of air along its surfaces, and consequently along members arranged to the rear of the rotorcraft, interfere in combination with one another on the overall conditions of such a flow and of its effects.

Consequently, choices need to be made concerning using the various fairing features singly or jointly in order to obtain a flow of air towards the rear of the rotorcraft that is judged to be satisfactory at best.

It is also desirable for the arrangement of the fairing to be usable without major modification, regardless of the general configuration of the rotorcraft, in order to avoid preparing a specific shape for the fairing that depends on the general structure of the rotorcraft, which structure varies among various families of rotorcraft.

As a result, there is a continuing search for a way of organizing a fairing so as to enhance a flow of air along its outside surface and obtain results that are satisfactory at best concerning the various constraints and requirements mentioned above.

BRIEF SUMMARY OF THE INVENTION

The present invention lies in the context of such a search and seeks to propose a rotorcraft having a fairing of the above-mentioned type arranged at the top of the rotorcraft and organized so as to ensure a flow of air towards the rear of the rotorcraft that overcomes in satisfactory manner the various above-mentioned problems that are raised.

The rotorcraft of the present invention is provided at its top with a fairing that is elongate along the longitudinally-extending direction of the rotorcraft, conventionally defined as being between the front and the rear of the rotorcraft when considered on the ground.

Said fairing typically covers a mechanism enabling a pilot of the rotorcraft to operate the blades of a main rotor of substantially vertical axis that provides the rotorcraft at least with lift, the fairing being arranged below the rotary wing of the main rotor and on top of a cover covering a power plant of the rotorcraft.

The profile of the fairing considered in a horizontal plane of the rotorcraft is more particularly in the shape of a truncated drop of water with a rear end comprising transversely at least a truncated portion and/or a sloping plane oriented perpendicularly to said horizontal plane of the rotorcraft, forming two side trailing edges of the fairing, promoting a regular flow of air towards the rotorcraft.

The rotorcraft of the present invention is mainly recognizable in that each of said two side trailing edges of the fairing is provided with at least one movable member having a degree of freedom to move in rotation relative to the fairing along the two trailing edges, such a movable member guiding the air of a first stream of air flowing along the fairing as it escapes at the trailing edges of the fairing towards the rear of the rotorcraft in flight.

Guiding the first stream of air by the movable member serves to deflect the first stream of air towards the sides of the rotorcraft so as to avoid a flow of the first stream of air towards the rear of the rotorcraft along its longitudinally-extending direction.

In summary, these provisions serve to deflect potential phenomena of aerodynamic instability, in particular turbulence phenomena, as typically generated by the first stream of air escaping at the trailing edges of the fairing, and thus to avoid the first stream of air disturbing the flow of air along the rear walls of the rotorcraft situated downstream from the fairing in the flow direction of the first stream of air.

More particularly, the first stream of air towards the rear of the rotorcraft is advantageously guided as a result of moving the movable member as a function of the effects produced by said first stream of air on the flow of air along the rear outside walls of the rotorcraft situated downstream from the fairing in the flow direction of the first stream of air, such as along a tail boom and/or a tail stabilizer fitted on the rotorcraft.

In the approach of the present invention, it should be understood that the aerodynamic arrangements of the fairing are conventionally arrangements of shape that are static. However, solutions that are based on such arrangements of the shape of the fairing for limiting the effects of the stream of air escaping from the fairing towards the rear of the rotorcraft rely on a compromise between various flight situations of the rotorcraft.

In accordance with the usual approach to arranging the shape of the fairing, such shape arrangements are generally effective for certain given flight situations of the rotorcraft, to the detriment of their effectiveness in other flight situations of the rotorcraft.

Furthermore, it should be observed that such shape arrangements of the fairing are currently defined for a rotorcraft of given overall structure and need to be adapted, or even profoundly modified, for rotorcraft of different overall structures, in particular with regard to their general shape and to the mechanical power supplied by their power plants.

The approach of the invention is based on unusual control of the way the stream of air flowing along the fairing escapes towards the rear of the rotorcraft, by means of a guide device having two movable members and serving to guide said first stream of air escaping from the fairing towards the rear of the rotorcraft.

Said control of the way the stream of air flowing along the fairing escapes towards the rear of the rotorcraft is potentially passive control resulting from operating the movable members under the effect of their wind resistance.

Said control of the way the stream of air flowing along the fairing escapes towards the rear of the rotorcraft is potentially also active control providing controlled guidance of said first stream of air. Such active control is advantageously provided by motor drive acting on the movable members and used as a function of aerodynamic disturbances to which said rear outside walls of the rotorcraft are subjected, which disturbances are identified by on-board instrumentation of the rotorcraft.

Thus, according to the general definition of the present invention, each of the two side trailing edges of said fairing fitted on the rotorcraft is provided with at least one movable member having a degree of freedom in rotation relative to the fairing along that trailing edge. Each of the movable members thus makes it possible to guide a first stream of air flowing along the fairing and escaping from one of the two trailing edges towards the rear of the rotorcraft in flight.

In an embodiment, each movable member is mounted free to move along one of the two trailing edges of the fairing, in such a manner that guidance of said first stream of air from the trailing edges of the fairing towards the rear of the rotorcraft in flight is caused spontaneously under the effect of the wind resistance of the movable members.

In a more advantageous embodiment, each movable member is preferably motor-driven, being operable by a motor, with use of the motor depending on information about the behavior of the rotorcraft in flight as provided by the on-board instrumentation of the rotorcraft.

Said information provided by the on-board instrumentation is information identifying in particular the aerodynamic disturbances to which said rear outside walls of the rotorcraft are subjected under the effect of the first stream of air escaping at the trailing edges of the fairing.

When each movable member is motor-driven, the movable member is operable by a motor, with use of the motor being regulated by control means as a function of information provided by the on-board instrumentation of the rotorcraft more particularly relating to the effects produced by the first stream of air on the flow of a second stream of air along at least one rear outside wall of the rotorcraft considered downstream from the fairing in the flow direction of said first stream of air.

In a preferred embodiment, in the event of the movable member being motor-driven, the motor is fitted with a clutching-declutching mechanism, the use thereof depending on a declutching order generated by a control member that can be activated by a human, in particular by the pilot of the rotorcraft. In the event of human-controlled declutching of the motor-drive, the movable member is thus driven spontaneously under the effect of its wind resistance.

Various difficulties to be overcome then arise and as a consequence choices must be made in order to organize said controlled guide device for guiding the first stream of air as it escapes from the fairing towards the rear of the rotorcraft.

One difficulty to be overcome relates to the structural organization and/or to the shaping proper of the movable member having an arrangement that is to promote the sought-after dynamic guidance of the first stream of air at the trailing edges of the fairing.

Furthermore, the motor-drive, if any, of said movable member, and said movable member itself, need to be easy to install on-board the rotorcraft while avoiding unduly increasing the weight of the rotorcraft and/or disturbing the flow of the first stream of air along the fairing, above all while avoiding disturbing the flow of air along the outside walls of the rotorcraft.

In a simple embodiment, it is proposed to arrange said movable member as a flap hinged to pivot on the fairing along one of the two trailing edges.

Such a flap may be easily motor-driven at actuation frequencies that correspond to the frequencies of variation in the overall movements of the rotorcraft in flight, and indeed at higher actuation frequencies for the movable member identified depending on the number of blades and on the speed of rotation of the main rotor.

However, it appears that such a solution could be improved in order to optimize the sought-after dynamic range and effectiveness in the guidance of the first stream of air towards the rear of the rotorcraft.

That is why in an ingenious embodiment, said movable member is arranged as a bladed roller rotatably mounted on the fairing along one of the two trailing edges. Said bladed roller is preferably motor-driven by being driven by said motor as regulated by the control means for controlling the direction and the speed of rotation of said bladed roller.

In diverse variant embodiments, the blades of said bladed roller may be:

oriented parallel to an axis of rotation of the bladed roller; or arranged in a helix wound around an axis of rotation of the bladed roller in order to provide, when necessary, timed phase shifting of the guidance of said first stream of air between the axial ends of the bladed roller along its axis of rotation.

In addition, said movable member is potentially a one-piece member along its axis of rotation. The concept of "one-piece" should be understood as the movable member being arranged in such a monolithic shape in which its surface for guiding the first stream of air is moved, all points between the ends of the movable member considered along its axis of rotation move together.

In a variant, said movable member is subdivided into successive segments along its axis of rotation, said segments being individually mounted to move along one of the two trailing edges of the fairing.

The motor-drive of the movable member is advantageously housed in the inside volume of the fairing in order to avoid said motor-drive disturbing in any way the flow of the first stream of air along the fairing.

More particularly, in an effective embodiment, the fairing advantageously houses a motor-drive for the movable member, the motor-drive comprising said motor and a drive train for transmitting drive that is interposed between the motor and the movable member.

Another difficulty then lies in selecting the rear zone of the rotorcraft that is to be taken into consideration in order to evaluate the influence of said first stream of air on said second stream of air. The rear outside wall of the rotorcraft should be selected not only as being representative of said influence, in particular with regard to the stability and the behavior of the rotorcraft in yaw, but also in such a manner that said influence can be evaluated as well as possible by the on-board instrumentation commonly fitted on rotorcraft, while limiting or even avoiding adding additional on-board instruments.

In order to overcome this difficulty, consideration is taken of the fact that rotorcraft are conventionally fitted with at least one tail stabilizer for stabilizing the attitude of the rotorcraft in flight, such as in particular a tail fin arranged in the longitudinally-extending direction of the rotorcraft in order to promote stabilization of the rotorcraft in yaw.

In this context, account is preferably taken of the effects produced by the first stream of air specifically on the flow of air along said tail stabilizer.

More particularly, for a rotorcraft being conventionally fitted with a tail stabilizer, and the way the movable member is driven by the motor depends on the effects produced by the first stream of air on a said second stream of air flowing along the tail stabilizer.

Naturally, this does not exclude the possibility of taking other rear outside walls of the rotorcraft into consideration, separately or in combination, in order to evaluate the effects produced by the first stream of air on any second stream of air flowing into the rear zone of the rotorcraft.

Another difficulty to be overcome relates to organizing the control means, preferably with the motor drive of the movable member being controlled automatically. However, it is also appropriate for such automatic control, relieving the pilot of the rotorcraft from performing an additional task, to be obtained in a manner that is reliable and effective, but without leading to a risk of inconveniencing the pilot.

That is why the control means preferably comprise a computer for automatic control of said motor as a function of said information provided to the control means by the on-board instrumentation of the rotorcraft.

Also preferably, the control means nevertheless comprise regulation means for regulating said motor as a function of command orders provided by a manual control member that is suitable for being activated by a member of the crew of the rotorcraft, in particular the pilot.

Indeed, the pilot of the rotorcraft is potentially capable of evaluating the influence of the first stream of air on the flow of air along the rear zone of the rotorcraft by feel. Moreover, said manual control member can be used to stop drive of the movable member being controlled automatically by said computer.

Thus, it must be considered that the command orders generated by the crew of the rotorcraft have priority of execution over instructions potentially generated simultaneously by said computer for automatic control of the motor.

There still remains the difficulty of how to evaluate the effects produced by the first stream of air on the second stream of air. On this topic, it should be noted that choosing to take a said second stream of air flowing along a tail stabilizer into consideration serves to take such a difficulty into account.

In order to overcome this difficulty, said information provided to the control means by the on-board instrumentation of the rotorcraft comprises first information relating to the vibratory motion specific to a tail stabilizer of the rotorcraft, in particular on a plane whether vertical or sloping of a tail fin.

It is naturally understood that such a tail stabilizer, such as in particular said tail fin, is conventionally located on board a rotorcraft downstream from the fairing along the flow direction of the first stream of air. Said vibratory motion proper of said tail stabilizer is naturally considered as separate from the vibratory motion to which the rotorcraft is subjected as a whole.

More particularly, said first information is advantageously generated by the on-board instrumentation using data provided by at least any one of the following groups of on-board instruments:

1) a first group of on-board instruments, comprising:
   a) at least a first accelerometer installed on-board the rotorcraft, in particular in the zone of the center of gravity of the rotorcraft or also and preferably in the front zone of the rotorcraft, in particular in the cockpit, so as to best provide information representative of the impact of the flow of the first stream of air at the rear of the rotorcraft; and
   b) at least a second accelerometer fitted on any tail stabilizer of the rotorcraft along which said second stream of air flows, and preferably on said tail fin; and
2) a second group of on-board instruments comprising at least a gyroscope fitted on the rotorcraft and forming part of an active control system for actively controlling the vibration to which the rotorcraft is subjected, such as a known system commonly referred to as an active vibration control system (AVCS). The second group of on-board instruments also comprises at least a third accelerometer fitted on any tail stabilizer of the rotorcraft along which said second stream of air flows, as relates to said second accelerometer.

In a variant, considered separately or in combination with the generation of said first information, said information provided by the on-board instrumentation of the rotorcraft to the control means preferably comprises second information.

Said second information advantageously relates to a current flight stage of the rotorcraft having an influence on the flow of the first stream of air towards the rear of the rotorcraft, such as in particular an approach stage of the rotorcraft approaching a landing point and/or the rotorcraft banking in a turn, or even an attitude of the rotorcraft sideslipping in yaw.

Said current flight stage of the rotorcraft is conventionally identified by the on-board instrumentation of the rotorcraft using data provided by a flight control unit of the rotorcraft, such as an automatic flight control system AFCS and/or an autopilot, for example. Such a flight control unit is conventionally suitable for identifying the current flight configuration of the rotorcraft, in particular typically determined according to the current flight mechanics of the rotorcraft.

Other on-board instruments may be used in order to generate said information provided by the on-board instrumentation of the rotorcraft to the control means. By way of example, such other on-board instruments may be pressure sensors generating data contributing to identifying the characteristics of the first stream of air and/or of the second stream of air.

Such pressure sensors are suitable for identifying an instability and/or an irregularity in the flow of the first stream of air and/or of the second stream of air.

This is why in a potential embodiment, the rotorcraft is fitted with such pressure sensors, including:

at least one first pressure sensor fitted to the fairing and contributing to identifying the characteristics of the first stream of air, and also at least one second pressure sensor fitted on the leading edge of said tail stabilizer and contributing to identifying the characteristics of the second stream of air.

In an embodiment, the control means are potentially means for regulating the motor in compliance with predefined modes of regulation used as a function of the information provided by the on-board instrumentation of the rotorcraft.

In this context, it is preferably proposed to cause such predefined modes of regulation to be implemented by an automatic system for controlling and correcting the effects that they produce on the flow of the second stream of at the rear of the rotorcraft as a function of information feedback provided by the on-board instrumentation of the rotorcraft.

More particularly, in a preferred embodiment, the control means incorporate correction means for correcting the regulation of the motor by calculation performed by the control means using information provided by the on-board instrumentation of the rotorcraft. Said correction means are means that are suitable for adapting the regulation of the motor, in particular by using algorithmic calculation filters such as Kalman filters, for example.

Such adaptation of the regulation of the motor by said correction means is particularly, but not exclusively, implemented as a result of the computer applying said predefined modes of regulation. The correction means adapt the regulation of the motor as a function of the variation of the effects produced by the movable member on the flow of the second stream of air along said at least one rear outside wall of the rotorcraft when it is being operated by the above-mentioned motor-drive, in particular by application of said predefined modes of regulation.

BRIEF DESCRIPTION OF THE SEVERAL VIEWS OF THE DRAWINGS

Embodiments of the present invention are described with reference to the figures of the accompanying sheets, in which.

DETAILED DESCRIPTION OF THE INVENTION

Figure 1:
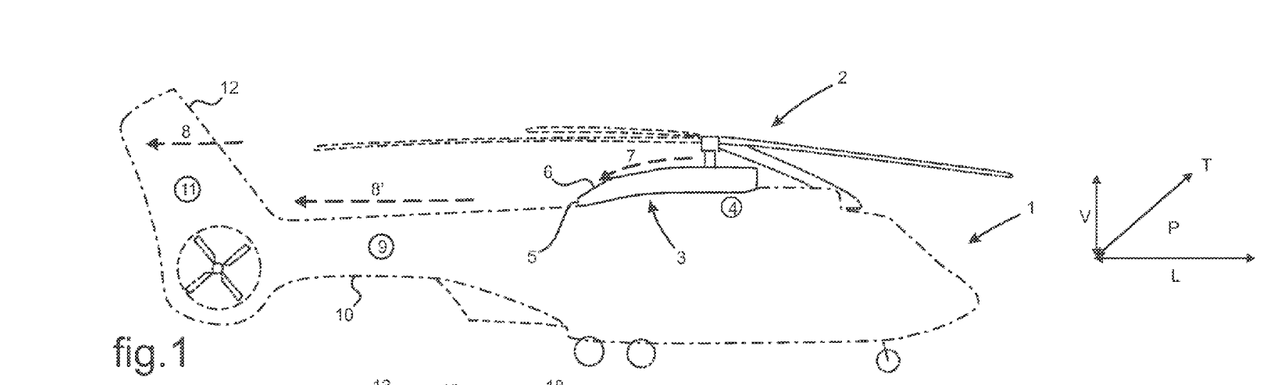
FIG. 1 is a side view of the outline of a rotorcraft of the present invention, in particular provided at its top with a fairing in a preferred embodiment.

In FIG. 1, a rotorcraft 1 is conventionally fitted with a main rotor 2 of axis that is substantially vertical that provides the rotorcraft 1 with at least its lift, and possibly also its propulsion and/or guidance along its movement axes.

In its portion at the top relative to the vertical V orientation, the rotorcraft 1 is also fitted with a power plant providing the rotorcraft 1 with the mechanical power necessary for operation, in particular at least for driving the main rotor 2 in rotation.

A fairing 3 for protecting a mechanism for operating the blades of the rotary wing constituted by the main rotor 2 is provided in conventional manner on top of a cover 4 for protecting the power plant. Said fairing 3 is typically arranged below the rotary wing of the main rotor 2 and it extends longitudinally in the longitudinally-extending direction L of the rotorcraft 1, conventionally considered as being between the front and the rear of the rotorcraft 1 when on the ground. The streamlined profile of the fairing 3 considered in a horizontally-extending plane P of the rotorcraft 1 is arranged like a drop of water that is truncated at the rear end of the fairing 3 directed towards the rear of the rotorcraft 1.

Figures 2, 3:
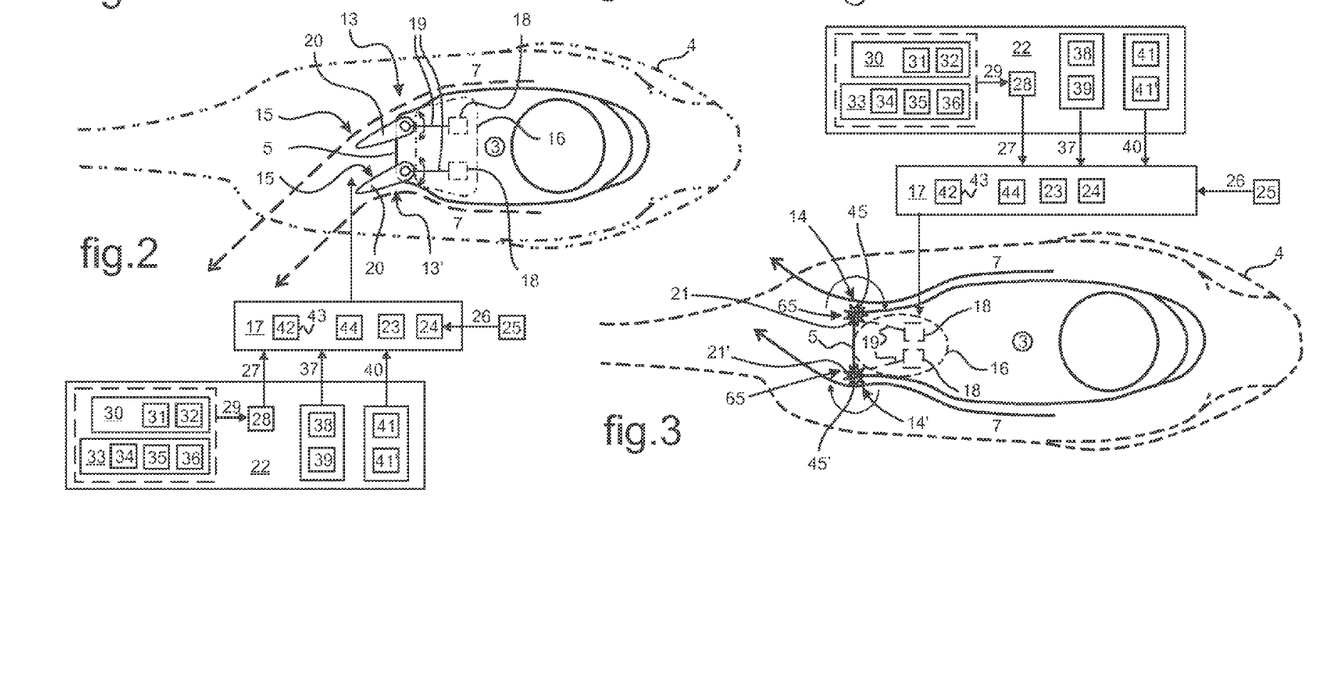
FIGS. 2, 3, and 4 are views from above of various respective embodiments of a fairing fitted on a rotorcraft of the present invention.
Figures 4, 5:
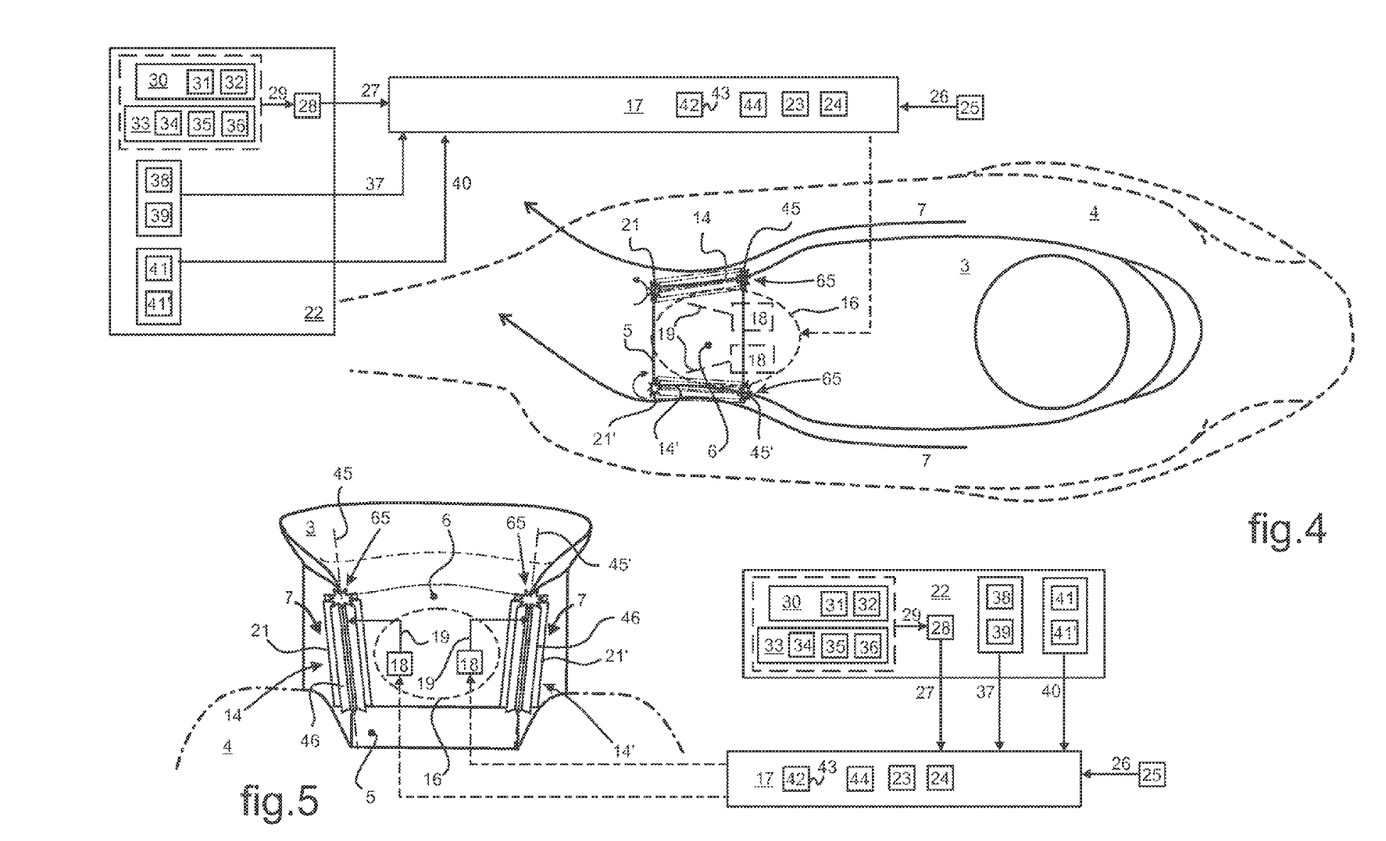
FIG. 5 is a rear view of the fairing shown in FIG. 4.

More particularly, in the preferred embodiment of the rotorcraft 1 of the invention shown, and as shown in FIGS. 3, 4, and 5, the rear wall of the fairing 3 further includes a truncated portion 5 formed at the rear of the waterdrop-shaped profile of the fairing 3, said truncated portion 5 extending transversely along the transverse orientation T of the rotorcraft 1. Furthermore, as in the preferred embodiment shown in FIG. 1, and also in FIGS. 4 and 5, the rear wall of the fairing 3 further comprises a sloping plane 6 in a said horizontally-extending plane P of the rotorcraft 1.

In this context, and with reference to all of FIGS. 1 to 5, it is commonly understood that a first stream of air 7 flowing along the fairing 3 generates aerodynamic disturbances along the rear outside walls 9, 11 of the rotorcraft 1, and in particular generates turbulence phenomena flowing along said rear outside walls 9, 11 of the rotorcraft 1.

More particularly in FIG. 1, the first stream of air 7 has an influence on the flow of at least a second stream of air 8, 8' along the rear outside walls 9, 11 of the rotorcraft 1, such as for example, along the rear outside wall 9 of a tail boom 10 of a rotorcraft 1 or along the rear outside wall 11 of a tail fin of a tail stabilizer 12 of the rotorcraft 1.

The truncated waterdrop-shaped profile of the fairing 3 provides two trailing edges of the fairing 3 via which the first stream of air 7 escapes towards the rear of the rotorcraft 1. It should be observed that the fairing 3 thus has two trailing edges 13, 13', 14, 14', as a result of providing the sloping plane 6 and/or of the truncated portion 5 at the rear of the fairing 3, and as can be seen in the embodiments shown in FIGS. 1 to 5.

In this context, the present invention proposes guiding the first stream of air 7 at the trailing edges 13, 13', 14, 14' of the fairing 3 in order to limit its influence on the flow of air along the rear outside walls 9, 11 of the rotorcraft 1.

More particularly, it is proposed to deflect the first stream of air 7 escaping from the fairing 3 towards one or the other of the sides of the rotorcraft 1 in the rearwardly-extending zone of the rotorcraft 1 going downstream from the fairing 3 in the flow direction of the first stream of air 7. The sides of the rotorcraft 1 are commonly understood as being the sides of the rotorcraft 1 extending in the longitudinally-extending direction L of the rotorcraft 1 and transversely to the horizontal plane P of the rotorcraft 1.

To this end, in FIGS. 2 to 5 and 7 each of the trailing edges 13, 13', 14, 14', 88, 88' of the fairing 3 is provided with a movable member 15, 65, 85 that may be moved by a motor-drive 16 having its implementation regulated by control means 17. Said motor-drive 16 is advantageously housed in the internal volume of the fairing 3 and in particular comprises at least one motor 18 engaged on a drive train 19 for transmitting drive from the motor 18 to the movable member 15, 65, 85.

In the embodiment shown in FIG. 2, said movable member 15 is more particularly arranged as a flap 20 that is pivotally mounted on the trailing edges 13, 13' of the fairing 3. Each of the trailing edges 13, 13' of the fairing 3 is thus fitted with a one-piece member flap 20 along a longitudinal direction parallel to a rotation axis of the flap 20 in relation to the fairing 3.

In the context of the embodiment shown in FIG. 2, the pivot axes of the flaps 20 are oriented along each of the trailing edges 13, 13' of the fairing 3 along the vertical dimension of the fairing 3 extending parallel to the vertically-extending orientation V of the rotorcraft.

In the embodiments shown respectively firstly in FIG. 3 and secondly in FIGS. 4 and 5, said movable member 65 is also a one-piece member along its rotation axis 45, 45' but is however arranged as a bladed roller 21, 21', each of the trailing edges 14, 14' of the fairing 3 being fitted with a respective bladed roller 21, 21'.

Such bladed rollers 21, 21' are oriented along the trailing edges 14, 14' of the fairing 3 while being driven in rotation by the motor-drive 16 in a direction and at a speed of rotation that are determined by the control means 17 as a function of the effects produced by the first stream of air 7 on the flow of the second stream of air 8, 8' along at least one of said rear outside walls 9, 11 of the rotorcraft 1.

It should be noted that the bladed rollers 21, 21' are driven in rotation firstly in respective directions of rotation that are opposite each other and secondly at respective speeds of rotation that are potentially different.

Moreover as shown in FIG. 5, such bladed rollers 21, 21' may comprise blades 46 oriented parallel to the axis of rotation 45, 45' of these bladed rollers 21, 21'.

Figure 7:
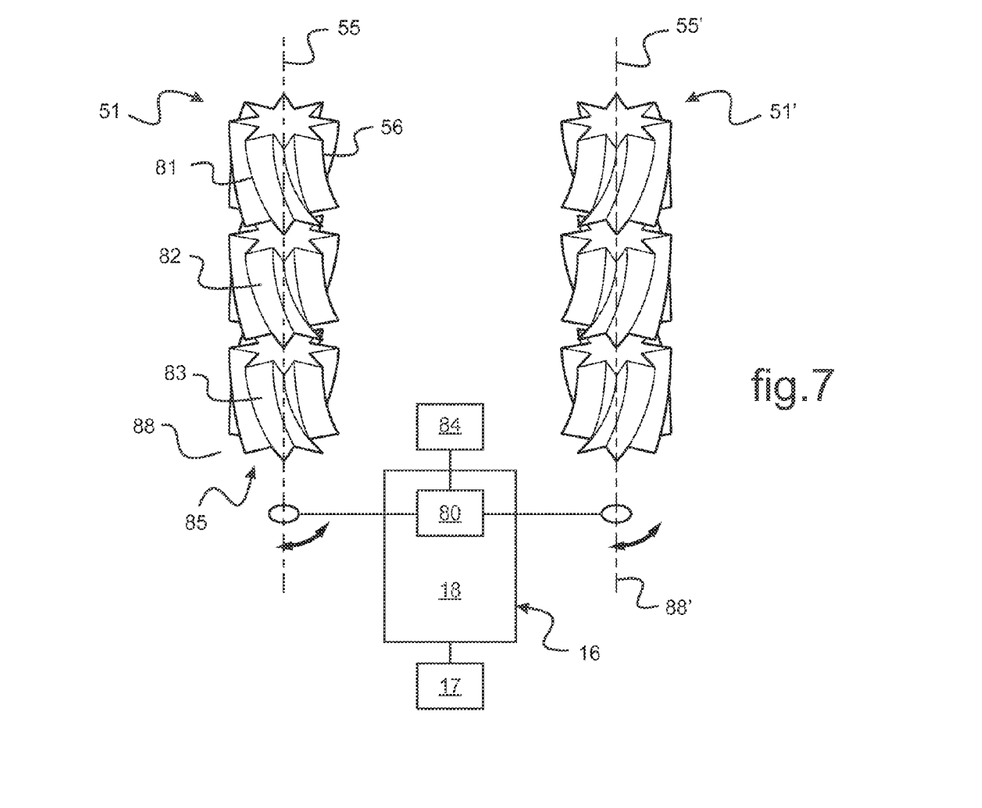

According to another embodiment as shown in FIG. 7, a movable member 85 may be also arranged as bladed rollers 51, 51' comprising blades 56 arranged respectively in helix wound around an axis of rotation 55, 55' of these bladed rollers 51, 51'.

Figure 6:
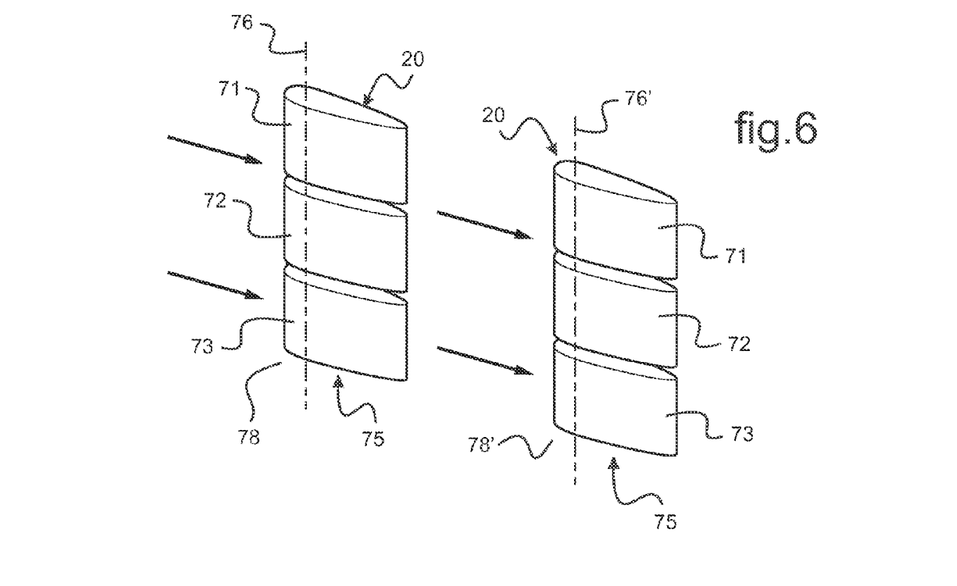
FIGS. 6 and 7 are two perspective views of various respective embodiments of movable members allowing guiding the stream of air escaping from the fairing towards the rear of the rotorcraft.

Furthermore according to the embodiments of FIGS. 6 and 7, the movable members 75, 85 may also be subdivided into successive segments 71-73, 81-83 arranged along the axis of rotation 76, 76', 55, 55' at the at least one trailing edge 78, 78', 88, 88' of the fairing 3.

Moreover as shown, such a movable member 75 may be mounted free to move along one of the at least one trailing edge 78, 78'. In that case, the stream of air 7 is spontaneously guided towards the rear of the rotorcraft 1 under the effect of the wind resistance of the movable member 75.

In addition as shown in FIG. 7, the motor 18 comprises a clutching-declutching mechanism 80 activated by a human with use of a control member 84. Indeed, such a control member 84 allows generating a declutching order which is then transmitted to the clutching-declutching mechanism 80 when for example the pilot of the rotorcraft punctually wishes that the stream of air 7 be spontaneously guided towards the rear of the rotorcraft 1 under the effect of the wind resistance of the movable member 85.

More particularly, in FIGS. 2 to 5 and 7, the control means 17 regulate the operation of said motor-drive 16 in order to move the movable member 15, 65, 85 as required.

Such needs are identified by on-board instrumentation 22 of the rotorcraft detecting the effects produced by the first stream of air 7 on the flow of the second stream of air 8, 8' along at least one of the rear outside walls 9, 11 of the rotorcraft 1 shown in FIG. 1, and in particular along the outside wall 11 of the tail fin of the tail stabilizer 12.

The control means 17 preferably comprise a computer 23 for automatic control of said at least one motor 18 and means 24 for priority regulation of the motor-drive 16 by application of a manual control.

The concept of "manual control" is naturally understood in contrast to "automated control".

Said regulation means 24 in particular implement a manual control member 25 that is suitable for being activated by the human pilot of the rotorcraft in order to generate command orders 26 for regulating the operation of the motor-drive 16.

The information transmitted to the control means 17 via the on-board instrumentation 22 of the rotorcraft may include, separately or in combination, a variety of information representative of the second stream of air 8, 8' being disturbed by the first stream of air 7.

By way of example, it is proposed to take account of vibratory phenomena specific to a tail stabilizer 12 of the rotorcraft 1, such as the tail fin of the tail stabilizer 12 of the rotorcraft 1, or in other words the vibration to which said tail stabilizer 12 is subjected excluding the vibratory phenomena to which the rotorcraft 1 is subjected as a whole.

More particularly, the information provided to the control means 17 by the on-board instrumentation 22 of the rotorcraft 1 comprise first information 27 relating to vibratory motion specific to the rear outside wall 11 of the tail stabilizer 12.

A calculation unit 28 that comprises the on-board instrumentation 22 of the rotorcraft 1 generates the first information 27 from the data 29 provided by at least one group of on-board instruments of the rotorcraft 1.

By way of example, the first information 27 is potentially determined by the on-board instrumentation 22 using data 29 provided by a first group 30 of on-board instruments comprising a first accelerometer 31 installed in the zone of the center of gravity of the rotorcraft 1 and a second accelerometer 32 fitted on the rear outside wall 11 of the rotorcraft 1.

Also by way of example, the first information 27 is potentially determined by the on-board instrumentation 22 using data 29 provided by a second group 33 of on-board instruments comprising a gyroscope 34 used by an active control system 35 for actively controlling the vibration to which the rotorcraft is subjected 1. The second group 33 of on-board instruments also comprises a third accelerometer 36 fitted on the rear outside wall 11 of the rotorcraft 1, e.g. as constituted by said second accelerometer 32.

By way of example, it is further proposed to take the current flight stage of the rotorcraft 1 into account using the on-board instrumentation 22, such that for example, an approach stage by the rotorcraft approaching a landing point has the potential to influence the orientation of the flow of the first stream of air 7 towards the rear of the rotorcraft 1.

To this end, the on-board instrumentation 22 may potentially generate second information 37 about the current flight stage of the rotorcraft 1, said second information 37 potentially being generated by a flight control unit 38 and/or by an autopilot 39 of the rotorcraft 1.

Additional information 40 may be provided by pressure sensors 41, 41' installed on the fairing 3 and on the leading edge of the tail fin of the tail stabilizer 12 respectively in order to provide the control means 17 with information 40 about the excitations to which the fairing 3 and the tail fin of the tail stabilizer 12 respectively are being subjected under the effect of instability in the flow of air along their walls.

The control means 17 are suitable for regulating the use of said at least one motor 18 in compliance with predefined modes of regulation 42 selected by the control means 17, and in particular by said computer 23, as a function of the information 27, 37, 40 provided by the on-board instrumentation 22. Naturally, such predefined modes of regulation 42 are stored in memory means 43 that are integrated in the control means 17 in association with said computer 23.

In this context, it is preferable for the control means 17 to incorporate correction means 44 for using calculation to correct the regulation of said at least one motor 18 by the control means 17, in particular by applying said predefined modes of regulation 42. Said correction means 44 are in particular of the type implementing Kalman filters or an analogous expert calculation system, making it possible to correct the use of the motor(s) 18 by using the control means 17 as a function variation of the effects produced by moving the movable member 15, 65, 85 on the flow of the second stream of air 8, 8'.

What is claimed is:

1. A rotorcraft provided with a top fairing that is elongate along a longitudinally-extending direction of the rotorcraft, defined as being between a front and a rear of the rotorcraft when considered on the ground, the fairing covering a mechanism enabling a pilot of the rotorcraft to operate blades of a main rotor of substantially vertical axis that provides the rotorcraft at least with lift, the fairing being arranged below a rotary wing of the main rotor and on top of a cover covering a power plant of the rotorcraft, the fairing having a profile considered in a horizontal plane of the rotorcraft having the shape of a truncated drop of water with a rear end comprising transversely at least a truncated portion and/or a sloping plane forming two side trailing edges of the fairing, each oriented transversely to the horizontal plane of the rotorcraft,
wherein each of the two side trailing edges of the fairing is provided with at least one movable member having a degree of freedom to move in rotation relative to the fairing along the two trailing edges, the at least one movable member guiding a first stream of air flowing along the fairing and escaping from one of the two trailing edges towards the rear of the rotorcraft in flight.

2. A rotorcraft according to claim 1, wherein the movable member is mounted free to move along one of the two trailing edges of the fairing, the guidance of the first stream of air from the trailing edges of the fairing towards the rear of the rotorcraft in flight being caused spontaneously under the effect of the wind resistance of the at least one movable member.

3. A rotorcraft according to claim 1, wherein the movable member is arranged as a flap hinged to pivot on the fairing along one of the two trailing edges.

4. A rotorcraft according to claim 1, wherein the movable member is a one-piece member along a axis of rotation of the movable member.

5. A rotorcraft according to claim 1, wherein the movable member is subdivided into successive segments along a rotation axis of the movable member, the segments being individually mounted to move along the at least one trailing edge of the fairing.

6. A rotorcraft according to claim 1, wherein the movable member is motor-driven, being operable by a motor, with use of the motor depending on information about the behavior of the rotorcraft in flight as provided by the on-board instrumentation of the rotorcraft.

7. A rotorcraft according to claim 6, wherein the motor is fitted with a clutching-declutching mechanism, with use of the mechanism depending on a declutching order generated by a control member that can be activated by a human.

8. A rotorcraft according to claim 6, wherein a motor-drive for the movable member is housed inside the fairing, the motor-drive comprising the motor and a drive train for transmitting drive that is interposed between the motor and the movable member.

9. A rotorcraft according to claim 6, wherein the rotorcraft is fitted with a tail stabilizer, the way the movable member is driven by the motor depends on the effects produced by the first stream of air on a the second stream of air flowing along the tail stabilizer.

10. A rotorcraft according to claim 6, wherein use of the motor is regulated by control means as a function of information provided by on-board instrumentation of the rotorcraft relating to the effects produced by the first stream of air on the flow of a second stream of air along at least one rear outside wall of the rotorcraft considered downstream from the fairing in the flow direction of the first stream of air.

11. A rotorcraft according to claim 10, wherein the control means comprise a computer for automatic control of the motor as a function of the information provided to the control means by the on-board instrumentation of the rotorcraft.

12. A rotorcraft according to claim 10, wherein the control means nevertheless comprise regulation means for regulating the motor as a function of command orders provided by a manual control member that is suitable for being activated by a member of the crew of the rotorcraft.

13. A rotorcraft according to claim 10, wherein the information provided to the control means by the on-board instrumentation of the rotorcraft comprises second information relating to the current flight stage of the rotorcraft having an influence on the flow of the first stream of air towards the rear of the rotorcraft.

14. A rotorcraft according to claim 10, wherein the information provided to the control means by the on-board instrumentation of the rotorcraft comprises data generated by pressure sensors, including:
   at least one first pressure sensor fitted to the fairing and contributing to identifying the characteristics of the first stream of air; and also
   at least one second pressure sensor fitted on the leading edge of the tail stabilizer and contributing to identifying the characteristics of the second stream of air.

15. A rotorcraft according to claim 10, wherein the control means are means for regulating the motor in compliance with predefined modes of regulation used as a function of the information provided by the on-board instrumentation of the rotorcraft.

16. A rotorcraft according to claim 10, wherein the control means incorporate correction means for correcting the regulation of the motor by calculation performed by the control means using information provided by the on-board instrumentation of the rotorcraft, the correction means adapting the regulation of the motor as a function of the variation of the effects produced by the movable member on the flow of the second stream of air along the at least one rear outside wall of the rotorcraft.

17. A rotorcraft according to claim 10, wherein the information provided to the control means by the on-board instrumentation of the rotorcraft comprises first information relating to the vibratory motion specific to a tail stabilizer of the rotorcraft.

18. A rotorcraft according to claim 17, wherein the first information is generated by the on-board instrumentation using data provided by at least any one of the following groups of on-board instruments:
   a first group of on-board instruments, comprising at least a first accelerometer installed in a front zone of the rotorcraft, at least a second accelerometer fitted on any tail stabilizer of the rotorcraft along which the second stream of air flows; and
   a second group of on-board instruments comprising at least a gyroscope fitted on the rotorcraft and forming part of an active control system for actively controlling the vibration to which the rotorcraft is subjected, as well as at least a third accelerometer fitted on any tail stabilizer of the rotorcraft along which the second stream of air flows.

19. A rotorcraft according to claim 1, wherein the movable member is arranged as a bladed roller rotatably mounted on the fairing along one of the two trailing edges.

20. A rotorcraft according to claim 19, wherein the bladed roller is driven by a motor as regulated by control means for controlling the direction and the speed of rotation of the bladed roller.

21. A rotorcraft according to claim 19, wherein the blades of the bladed roller are oriented parallel to an axis of rotation of the bladed roller.

22. A rotorcraft according to claim 19, wherein the blades of the bladed roller are respectively arranged in a helix wound around an axis of rotation of the bladed roller.

* * * * *